Jan. 16, 1923.
C. F. STEHLIN.
TRANSMISSION OILER.
FILED SEPT. 21, 1921.
1,442,789
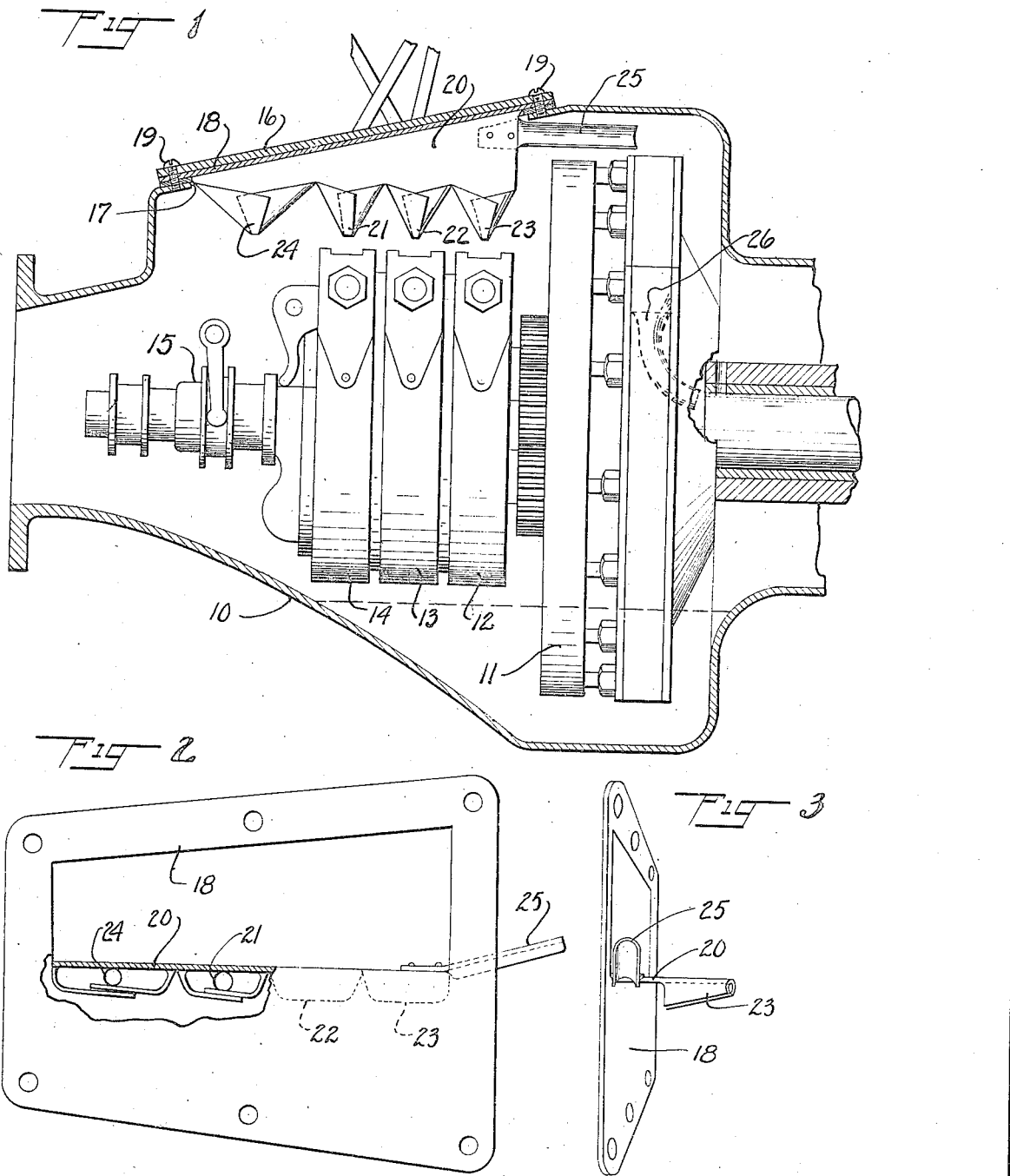
INVENTOR
Charles F. Stehlin
BY
H. H. Dyke
ATTORNEY Patented Jan. 16, 1923.

1,442,789

UNITED STATES PATENT OFFICE.

CHARLES F. STEHLIN, OF NEW ROCHELLE, NEW YORK.

TRANSMISSION OILER.

Application filed September 21, 1921. Serial No. 502,225.

*To all whom it may concern:*

Be it known that I, CHARLES F. STEHLIN, a citizen of the United States, and a resident of New Rochelle, county of Westchester, State of New York, have invented certain new and useful Improvements in Transmission Oilers, of which the following is a specification.

My invention relates to a transmission oiling device particularly applicable to the well known Ford engine and transmission unit.

The rotating flywheel dynamo of the Ford engine is relied upon to supply oil to the transmission, but with the usual construction, rotation of the flywheel results in a similar rotation of the oil which is held, principally by centrifugal force, upon or close to the walls of the transmission casing, with the result that the transmission gears and related parts, located at about the center of the casing, get little or no oil, the bands and gears wear rapidly, and the clutching and braking action of the bands is irregular and uncertain.

According to the present invention, means are provided for positively directing the oil upon the parts to be lubricated. A longitudinal fin or partial partition is provided in the casing, preferably by forming same on a sheet placed under the usual top inspection plate. This fin or partition serves to convert the rotary motion of oil coming into contact therewith into inward motion toward the axis of the transmission casing and means are provided for directing the oil coming into contact with the fin to the bands and other parts to be lubricated.

It is important that the spouts or other means for directing the oil be carried within the casing to a substantial distance from the casing wall, since, if this be not done, the drops or streams of oil diverted from rotary to inward motion by the fin will not fall upon the working parts, but will be caught by the circulating oil and air within the casing and carried back to the walls. There appears to be a sort of zone within the casing, such that when the oil is outside this zone, it will be carried with the circulating air and other contents of the casing to the wall thereof, but when oil is delivered inside of this zone, the forces tending to carry the oil to the walls are overcome by gravity, and the force resulting from deflection of the oil from rotary movement to inward movement, so that the oil is delivered upon and lubricates the working parts, and the device of the present invention is so constructed as to bring the oil from outside such zone to within the zone, and to supply the necessary oil to the working parts at all times when the engine is in operation.

With the foregoing and related objects in view, my invention consists in the combinations and features of construction herein described and claimed. In the drawings, Fig. 1 is a longitudinal sectional view showing the invention applied to the Ford engine and transmission unit. Fig. 2 is a top view, partly in section, of the plate and deflector thereon, and Fig. 3 is a perspective view of the parts shown in Fig. 2 looking from the end thereof.

Reference character, 10 designates the housing of the Ford transmission containing the usual dynamo flywheel 11 and the planetary transmission, including transmission and brake bands, 12, 13 and 14 and collar 15. The cover 16 for inspection opening 17 affords a convenient support for the device of my invention, which preferably is embodied in a metal plate 18 fitting under the cover 16 and held in place by the cover fastening devices, as screws 19.

On the under side of the plate 18 is supported the longitudinally extending deflector or partial partition wall 20, which is preferably formed by being struck out from the material of plate 18. Said deflector 20 is provided with a plurality of spouts 21, 22 and 23 to carry the oil close to the bands 12, 13 and 14, and a spout 24 to carry the oil sufficiently close to the collar 15 so that it will be delivered thereon. In the form shown these spouts are provided by cutting into and bending over the material of the sheet metal wall or deflector 20, but they may be constructed in other ways, if desired. The deflector 20 is also provided with a laterally directed backwardly extending spout 25 to carry the oil over the flywheel 11, whence it is directed (along with other oil thrown off by flywheel 11) into the funnel 26, located behind the flywheel 11, and therefore shown in dotted lines, to carry the oil to the main engine bearing, or to other parts of the mechanism.

The spouts on the lower part of the baffle 20 extend inwardly, so that oil discharged therefrom is delivered within the zone above referred to, and oil upon leaving the spouts is discharged in relatively large quantities directly upon the bands and collars. Also the spout 25 extends over and above the flywheel and positively directs the oil into funnel 26.

In the operation of the device the centrifugal flow of oil over the wall of the housing is interrupted by deflector 20, and the oil, which may be described as striking against the baffle by impact of the rotating oil and oily spray thereagainst, is carried within the critical zone and directed in streams directly upon the parts to be oiled.

My invention is capable of being realized in a variety of embodiments coming within my claims by which the invention is defined.

I claim:

1. An oiling device for oiling a planetary transmission in its housing, comprising a deflector plate arranged to extend substantially longitudinally of the housing and also to extend inwardly from the housing walls, and provided with a plurality of oil conducting conduits arranged to extend substantially close to the working parts of the transmission bands, whereby oil traveling along the inner wall of the housing is deflected inwardly and delivered by said conduits from said deflector close to the transmission bands.

2. An oiling device for a planetary transmission, in which the oil is circulated centrifugally within the transmission housing about the walls thereof, comprising a plate adapted to be received and held under the housing cover, a deflector on said plate, said deflector being arranged longitudinally of the housing and extending inwardly from said plate and adapted to deflect oil traveling along the inner wall of the housing so that the oil moves inwardly away from the housing wall, and spouts leading from the deflector to close to the working parts of the transmission, whereby the oil is discharged substantially directly on said working parts.

3. In an oiling device for the transmission of an internal combustion engine, comprising a flywheel and planetary transmission unit in the same housing, a plate adapted to be received and held under the housing cover, a deflector struck out from said plate and extending downwardly over the transmission bands and adapted to deflect oil traveling along the inner wall of the housing so that same travels inwardly away from the housing wall, and spouts formed from the material of said deflector and leading close to the transmission bands, whereby oil is delivered close to the bands.

4. In an oiling device for the transmission of an internal combustion engine, comprising a flywheel and planetary transmission unit in the same housing, a plate adapted to be received and held under the housing cover, a deflector struck out from said plate and extending downwardly over the transmission bands, spouts formed from the material of said deflector and leading close to the transmission bands, whereby oil is delivered close to the bands, and a spout leading over the flywheel to direct the oil to other working parts.

5. An oiling device for oiling a planetary transmission in its housing, said transmission comprising a plurality of transmission bands and a transmission collar, said oiling device comprising a deflector plate arranged to extend substantially longitudinally of the housing and also to extend inwardly from the housing walls and adapted to deflect oil traveling along the inner wall of the housing so that same travels inwardly away from the housing wall, and a series of oil conduits extending from said plate and adapted to serve as a means for oil discharged therefrom, the discharge ends of said conduits extending over the transmission bands and the transmission collar and adapted to deliver oil thereto.

6. An oiling device for a planetary transmission in its housing, comprising an oil deflector extending substantially longitudinally of the housing over the transmission bands, the lower portion of said deflector being close to the transmission bands and the upper portion thereof close to the upper wall of the housing, whereby oil traveling along the housing walls is deflected to travel downwardly and is delivered from the lower part of said deflector sufficiently far away from the housing walls to be lodged upon the transmission bands and prevented from being carried away therefrom with the circulating contents of the housing.

In testimony that I claim the foregoing, I have signed my name hereto.

CHARLES F. STEHLIN.